United States Patent [19]

Grant

[11] 3,863,008
[45] Jan. 28, 1975

[54] SOMATOSTATIN AS STIMULANT OF LUTEINIZING HORMONE SECRETION

[75] Inventor: Norman H. Grant, Wynnewood, Pa.

[73] Assignee: American Home Products Corporation, New York, N.Y.

[22] Filed: June 11, 1973

[21] Appl. No.: 368,557

[52] U.S. Cl. .............................................. 424/177
[51] Int. Cl. .................... A61k 27/00, C07c 103/52
[58] Field of Search.................. 260/112.5; 424/177

[56] References Cited
OTHER PUBLICATIONS

Brazeau et al.: Science, 179, 77–79, (1973).
Rivier et al.: Chem. Abstr., 79:53765r, (1973).
Burgus et al.: Chem. Abstr., 78:144471n, (1973).

Primary Examiner—Lewis Gotts
Assistant Examiner—Reginald J. Suyat

[57] ABSTRACT

Somatostatin and its linear counterpart are described as stimulating the release of luteinizing hormone.

6 Claims, No Drawings

SOMATOSTATIN AS STIMULANT OF LUTEINIZING HORMONE SECRETION This invention relates to the tetradecapeptide somatostatin and its linear counterpart and the use of these tetradecapeptides in stimulating the release of luteinizing hormone and hence promoting ovulation in mammals and increasing production of testosterone.

Somatostatin is the tetradecapeptide

H-Ala-Gly-Cys-Lys-Asn-Phe-Phe-Trp-Lys-Thr-Phe-Thr-Ser-Cys-OH.

This tetradecapeptide has only recently been identified by isolation from extracts of ovine hypothalamic tissues and found to inhibit the secretion of growth hormone (GH); See Brazeau et al., Science, 179 pp 77–79 (Jan. 1973). This same tetradecapeptide has also been reported by Brazeau et al., supra, to have been synthesized by solid phase methodology and found to have the same biological activity as the somatostatin obtained from a natural source. In addition the solid phase synthesis of H-Ala-Gly-Cys-Lys-Asn-Phe-Phe-Trp-Lys-Thr-Phe-Thr-Ser-Cys-OH, the linear form of somatostatin, has been reported.

The present invention relates to the discovery that somatostatin and its linear counterpart are useful in stimulating the release of luteinizing hormone. Luteinizing hormone is one of the hormones obtained from the adenohypophysis. In the male, luteinizing hormone activates the interstital cells of the testis (Leydig cells) with the consequent production of testicular androgen. Luteinizing hormone also acts synergistically with follicle-stimulating hormone to promote the secretion of estrogen by follicles undergoing maturation and to cause ovulation and luteinizing hormone is also conceived with the formation of corpora lutea.

As used herein somatostatin means the tetradecapeptide of the formula

H-Ala-Gly-Cys-Lys-Asn-Phe-Phe-Trp-Lys-Thr-Phe-Thr-Ser-Cys-OH, whether obtained from natural sources or made synthetically. It also includes those materials of natural origin which contain somatostatin in non-isolated form such as extract of ovine hypothalamic tissue. The linear counterpart of somatostatin embraced by the present invention is represented by the formula H-Ala-Gly-Cys-Lys-Asn-Phe-Phe-Trp-Lys-Thr-Phe-Thr-Ser-Cys-OH. Thus, the structural difference between somatostatin and its linear counterpart is that the former has a bridging bond between the sulfhydryls of the two cysteinyl amino acid residues in the tetradecapeptide. The definition of somatostatin and the linear counterpart of somatostatin also includes those compounds having a side chain protecting group on an amino acid residue of such tetradecapeptide. Thus, for example, the sulfhydryls of the two amino acid residues in the linear compound may have the hydrogen atom replaced by a protecting group such as benzyl, benzyloxycarbonyl, nitrobenzyl, trityl, methoxybenzyl, carboxymethyl, etc. Similarly, as shown in Example 1, protecting groups may be present on the other amino acid residues in the tetradecapeptide having either a side chain hydroxyl or amino substituent. These protecting groups are preferably split off as shown in Example 2 but can remain on the compound when used for stimulation of luteinizing hormone secretion. Thus, the side chain alcoholic hydroxyl group on the serine and threonine amino acid residues can be protected by such groups as tosyl, acetyl, benzoyl, tert-butyl, trityl, benzyl and benzyloxycarbonyl. The protecting groups for the side chain amino group on lysine are illustrated by benzyl, benzyloxycarbonyl, tosyl, t-butyloxycarbonyl, 2,4-dinitrophenyl, t-amyloxycarbonyl, etc.

In selecting a particular side chain protecting group to be used in the synthesis of the tetradecapeptides described herein, the following rules should be followed: (a) the protecting group must be stable to the reagent and under the reaction conditions selected for removing the α-amino protecting group at each step of the synthesis, (b) the protecting group must retain its protecting properties (i.e. not be split off under coupling conditions, and (c) the side chain protecting group must be removable upon the completion of the synthesis containing the desired amino acid sequence under reaction conditions that will not alter the peptide chain.

Also included within the scope of the present invention are non-toxic acid addition salts of somatostatin and its linear counterpart such as hydrochloride, hydrobromide, sulfate, phosphate, maleate, acetate, citrate, benzoate, succinate, malate, ascorbate, and the like.

The following examples are illustrative of the preparation of somatostatin and its linear counterpart.

EXAMPLE 1

L-Alanylglycyl-S-p-methoxybenzyl-L-cysteinyl-N-carbobenzoxy-L-lysyl-L-asparaginyl-L-phenylalanyl-L-phenylalanyl-L-tryptophyl-L-lysyl-O-benzyl-L-threonyl-L-phenylalanyl-O-benzyl-L-threonyl-O-benzyl-L-seryl-l-S-p-methoxybenzyl-L-cysteine resin Chloromethylated resin 12.0 g. (received from Bio Rad: Bio Beads SX-1 200–400 mesh chloromethylated 1.25 meg/g) is gently refluxed with 5.1 g, of Boc-S-p-methoxybenzyl-cysteine in 45 ml. of absolute alcohol and 1.95 ml. of triethylamine under mechanical stirring for 48 hours. After thorough washes with alcohol the resin is dried in vacuo to weigh 13.5 g. The resin is then placed in a Merrifield vessel and deprotected with a mixture of trifluoroacetic acid methylene chloride (1:1) containing 5% ethane dithiol (3 times for 10 minutes each). The resin is subsequently washed with methanol (2 times), methylene chloride (2 times) 12.5% triethylamine in dimethylformamide (3 times), methanol (2 times), methylene chloride (2 times). The ninhydrin test is then strongly positive. The protected amino acids are then added one by one, starting with t-Boc-O-benzyl-L-serine (8.85 g./30 ml. 1M DCC, 18 hours) and the coupling mediated by 1M dicyclohexyl carbodiimide in dimethylformamide in a medium of dimethylformamide; methylene chloride (1:1). Deblocking and wash cycles are as indicated above, and the course of the synthesis is monitored by the ninhydrin test.

Following the coupling of t-Boc-O-benzyl-L-serine, the resin is removed and the synthesis is continued with two-thirds of the original amount. After deblocking, t-Boc-O-benzyl-L-threonine (3.68 g./12 ml. 1M DCC, 18 hours) is added. The synthesis is continued with the following protected amino acids: t-Boc-L-phenylalanine (3.17 g./12 ml. 1M DCC, 3 hours); t-Boc-O-benzyl-L-threonine (3.68 g./12 ml. 1M DCC, 15 hours); t-Boc-ξ-carbobenzoxy-L-lysine (4.54 g.,12 ml. 1M DCC, 18 hours); t-Boc-L-tryptophan (3.63 g./12 ml. 1M DCC, 3 hours); t-Boc-L-phenylalanine (3.7 g./12 ml. 1M DCC, 18 hours); t-Boc-L- phenylalanine (3.7 g./12 ml. 1M DCC, 3 hours); t-Boc-L-asparagine (2.77 g./12 ml. 1M DCC, 18 hours) followed by 1.38 g. t-Boc-L-asparagine and 6 ml. of 1M DCC (4 hours); α-t-Boc-ξ-carbobenzoxy-L-lysine (4.54 g./12 ml. DCC, 18 hours); t-Boc-S-p-methoxybenzyl-L-cysteine (4.05 g.12 ml. 1M DCC, 18 hours); t-Boc-glycine (2.08 g./12 ml. 1M DCC, 18 hours); carbobenzoxy-L-alanine (2.67 g./12 ml. 1M DCC, 3 hours). The addition of t-Boc-L-asparagine may result in formation of nitrile at the β carboxamide function and the synthesis is better carried out by coupling an active ester of t-Boc-L-asparagine. However, subsequent treatment of the product with liquid HF might convert possibly formed nitrile back to the desired carboxamide. After the synthesis is completed, the resin is removed from the vessel, washed with methanol and dried in vacuo (13.0 g. total weight).

EXAMPLE 2

Acetate salt of L-alanylglycyl-L-cysteinyl-L-lysyl-L-asparaginyl-L-phenylalanyl-L-phenylalanyl-L-tryptophyl-L-lysyl-L-threonyl-L-phenylalanyl-L-threonyl-L-seryl-L-cysteine The above resin (5.0 g.) obtained in Example 1 is dissolved in 5.5 ml. of liquid hydrogen fluoride and 15 ml. of anisole and reacted for 1 hour at 0°C. Then hydrogen fluoride is removed as quickly as possible, the resin is washed with ether, degased 10% acetic acid and methanol. The aqueous extract is lyophilized to leave 1.38 g. of an off white powder.

The above powder (700 mg.) is dissolved on 0.2N acetic acid containing 3% mercaptoethanol and applied on a Sephadex 9-25 F column (120 cm × 3 cm) previously equilibrated with 0.2N acetic acid, 3% in mercaptoethanol and fractions of 13 ml. each are taken. The material is eluted in three fractions: 30-34 (134 mg.) A, 35-42 (235 mg.), B, and 43-52 (178 mg.) C. On thin layer chromatography (Bu:AcOH:H₂O · EtOAc-1:1:1:1) fractions A and B were indistinguishable, showing one streaking spot (Rf 0.7), fraction C showed three spots (somewhat streaky). A sample of Fraction B is hydrolyzed in 6N HCl under a nitrogen blanket at 138°C for 4 hours. The following amino acid analysis is obtained: Asp 1.00 (1); Thr 1.80 (2); Ser 0.58 (1); Gly 1.35 (1); Ala 1.18 (1 ); Phe 2.40 (3); Lys 2.00 (2); Cys 0.63 (2).

EXAMPLE 3

Somatostatin

A linear tetradecapeptide having the structure of Example 2 (56 mg.) is dissolved in 1% aqueous ammonium acetate (120 ml.) and the pH adjusted to 8.4 by the addition of 1% ammonium carbonate (38 ml.). The reaction mixture is allowed to stand in air during 60 hours. The solution pH drops to 8.19. The total reaction mixture is lyophilized (thrice) both to ensure removal of buffer and to contain the sample in progressively smaller vessels. The residue is subjected to a partition chromatography on Sephadex G-25 BAW column (BAW = n-butanol:acetic acid:water 4:1:5; 60 × 1 cm. column with a void volume, $V_o = 14$ ml.). Eluted fractions monitored by ultra-violet absorbance at 280 mμ reveal minor peaks at 1 $V_o$ and 2 $V_o$. A major peak of ninhydrin positive material occurs at 3 $V_o$. Evaporation and lyophilization of the major peak yields 15.5 mg. of white solid (yield 27%) $[\alpha]_D^{26} - 31°$ (c, 0.46 in 1% HOAc). It shows one ninhydrin-positive spot in three tlc systems using Eastman "chromagram" SiO₂ TLC sheet plates. $R_f$'s obtained in 1. Butanol:acetic acid:water—4:1:5 (top phase) —0.33
2. Isopropanol: 1N aqueous acetic acid—2:1—0.59.
3. Isopropanol: 1N ammonium hydroxide—2:1—0.26.

Amino acid analysis after hydrolysis in 6N HCl containing 0.5% thioglycollic acid:

| Asp | 2 Thr | Ser | Gly | Ala | 3 Phe | 2 Lys | NH₃ | Trp | Cys |
|---|---|---|---|---|---|---|---|---|---|
| 1.0 | 1.9 | 0.7 | 1.0 | 1.0 | 3.2 | 2.1 | 1.7 | 1.1 | 1.8 |

EXAMPLE 4

Di-S-carboxymethyl Somatostatin

To 3.6 mg. (1.48 μmole) of peptide is added 60 μl. (0.86 mmole) of 2-mercaptoethanol in 400 μl. of 0.5M trimethylammonium acetate buffer (pH 8.5). The mixture is incubated for 4.5 hours at room temperature, after which 20 μl of glacial acetic acid is added and the solution is lyophilized. To the reduced peptide in 800 μl of 0.5M pyridine acetate—0.005M 2-mercaptoethanol buffer (pH 6.0) is added 200 μl of 0.1M iodoacetic acid in the same buffer. After incubation at room temperature for 20 minutes with occasional mixing, 12 μl (200 μmole) of 2-mercaptoethanol is added and the mixture is allowed to stand at room temperature for an additional 15 minutes; 40 82 l of acetic acid is then added, and the solution is lyophilized. The residue is twice dissolved in 400 μl of 0.1M acetic acid containing 12 μl of 2-mercaptoethanol and lyophilized. The product is hydroscopic and gummy until subsequent treatment with absolute ethanol and drying under vacuum. This product is also described by Burgus et al., Proc. Nat. Acad, Sci. 70, 684 (1973).

The luteinizing hormone releasing activity of the compounds is determined by radioimmunoassay in a rat pituitary cell culture system as described by Vale et al., Endocrinology 91, pp 562 (1972) and Grant et al., Biochemical and Biophysical Research Communications 51, pp 100-106 (1973). The compound of Example 2 was tested as low as 0.1 μg/ml and was found to stimulate luteinizing hormone release. The compound of Example 3 was active at a concentration as low as 50 μg/ml in stimulating luteinizing hormone release. As stimulants of luteinizing hormone, the compounds described herein have application in the same areas as the Luteinizing Hormone Releasing Factor (LRF) such as initiation of ovulation and stimulation of fertility as described by Schally et al., Am. J. Obstet. Gynecol. pp 423-441 (October 1972).

The compounds described herein may be administered to warm blooded mammals, including humans, either intravenously, subcutaneously, intramuscularly or orally. The contemplated dose range for oral administration in tablet or capsule form to large mammals is about 0.015 mg to about 7 mg/kg of body weight per day while the dose range for intravenous injection in an aqueous solution is about 0.1 μg to about 0.15 mg/kg of body weight per day. When administered subcutaneously or intramuscularly a dose range of about 1.5 μg to about 0.7 mg/kg of body weight per day is contemplated. Obviously, the required dosage will vary with the particular condition being treated, the severity of the condition and the duration of treatment.

If the active ingredient is administered in tablet form the tablet may contain: a binder such as gum tragacanth, corn starch, geletin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

What is claimed is:

1. A method of stimulating the release of luteinizing hormone in a mammal, which comprises administering to said mammal an effective amount for stimulating luteinizing hormone release of a material selected from the class consisting of H-Ala-Gly-Cys-Lys-Asn-Phe-Phe-Trp-Lys-Thr-Phe-Thr-Ser-Cys-OH, (I)

H-Ala-Gly-Cys-Lys-Asn-Phe-Phe-Trp-Lys-Thr-Phe-Thr-Ser-Cys-OH.

(II)

and the non-toxic acid addition salts thereof, said material of formula I being optionally substituted with a protecting group on the sulfhydryl moiety of each cysteinyl amino acid residue in said material of formula I, said protecting group being selected from the group consisting of benzyl, benzyloxycarbonyl, nitrobenzyl, trityl, methoxybenzyl and carboxymethyl.

2. A method according to claim 1 wherein said material of formula I is obtained from hypothalamic tissue.

3. A method according to claim 1 wherein in said protecting group linked to the sulfhydryl moiety is carboxymethyl.

4. A method of stimulating the release of luteinizing hormone in a warm blooded mammal which comprises administering to said mammal an effective amount for stimulating luteinizing hormone secretion of a material selected from the class consisting of H-Ala-Gly-Cys-Lys-Asn-Phe-Phe-Trp-Lys-Thr-Phe-Thr-Ser-Cys-OH.

H-Ala-Gly-Cys-Lys-Asn-Phe-Phe-Trp-Lys-Thr-Phe-Thr-Ser-Cys-OH,

H-Ala-Gly-Cys(S—CH$_2$—COOH)-Lys-Asn-Phe-Phe-Trp-Lys-Thr-Phe-Thr-Ser-Cys(S—CH$_2$COOH)-OH and the non-toxic acid addition salts thereof, said material being administered either orally, intravenously, subcutaneously or intramuscularly.

5. A method according to claim 4 wherein said material is

H-Ala-Gly-Cys-Lys-Asn-Phe-Phe-Trp-Lys-Thr-Phe-Thr-Ser-Cys-OH.

6. A method according to claim 4 wherein said material is

H-Ala-Gly-Cys-Lys-Asn-Phe-Phe-Trp-Lys-Thr-Phe-Thr-Ser-Cys-OH.

* * * * *